(12) United States Patent
Shimobayashi

(10) Patent No.: US 7,515,628 B2
(45) Date of Patent: Apr. 7, 2009

(54) PORTABLE TERMINAL SET AND CONTROL METHOD THEREOF

(75) Inventor: Shinya Shimobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 610 days.

(21) Appl. No.: 11/224,085

(22) Filed: Sep. 13, 2005

(65) Prior Publication Data
US 2006/0056495 A1    Mar. 16, 2006

(30) Foreign Application Priority Data
Sep. 14, 2004    (JP) ............................ 2004-267556

(51) Int. Cl.
H04B 1/00    (2006.01)
(52) U.S. Cl. ..................... 375/136; 375/147; 375/316
(58) Field of Classification Search ............... 375/136, 375/147, 316
See application file for complete search history.

(56) References Cited

U.S. PATENT DOCUMENTS 5,926,503 A * 7/1999 Kelton et al. ............... 375/148
6,049,538 A * 4/2000 Scott .......................... 370/347
6,507,619 B1 * 1/2003 Thomson et al. ........... 375/241

FOREIGN PATENT DOCUMENTS

| JP | 11-284635 A | | 10/1999 |
| JP | 11284635 A | * | 10/1999 |
| JP | 2000-115070 A | | 4/2000 |
| JP | 2000115070 A | * | 4/2000 |
| JP | 2001-103529 A | | 4/2001 |
| JP | 2001103529 A | * | 4/2001 |

* cited by examiner

Primary Examiner—Juan A Torres
(74) Attorney, Agent, or Firm—Foley & Lardner LLP (57) ABSTRACT

Monitoring is made as to whether the serial number of header incorporated to the data sent to a Radio Link Control (RLC) after a decoding process is continuous. When it is determined as a result of monitoring for a predetermined period of time that no defect is present in the header numbers, a multi-path timing is detected by taking a correlation between the result of the detection and spread codes of received signals and a pilot signal. From this multi-path timing, a station, from which data are to be received in fingers, is determined for interrupting processes of de-spread, RAKE reception and decoding, thus reducing power consumed in the processes.

16 Claims, 5 Drawing Sheets

PORTABLE TERMINAL SET AND CONTROL METHOD THEREOF

BACKGROUND OF THE INVENTION

This application claims benefit of Japanese Patent Application No. 2004-267556 filed on Sep. 14, 2004, the contents of which are incorporated by the reference.

The present invention relates to portable terminal set and portable terminal control method capable of suitably receiving data of a service for broadcasting data of a large volume of contents including video and images to a plurality of portable terminal sets.

As a mobile communication system, a service is provided, which broadcasts data of a large volume of the same contents including voice and images to a plurality of portable terminal sets. This system is called MBMS (Multimedia Broadcast Multicast System).

In MBMS of broadcast type, a number of portable terminals receive a common channel (hereinafter referred to as a common channel). Therefore, it is impossible to control power of the common channel based on the receiving quality of each portable terminal. This means that it is impossible to control the receiving operation for each data broadcast via the common channel. For example, in the neighborhood of the boundary between the coverage areas of base stations, in which the received signal quality is subject to deterioration, the portable terminal receives the same data from a plurality of base stations at different timings spaced apart by a predetermined time interval, decodes the signal from each base station, and selects data of good or better quality (this method being hereinafter referred to as selective combining method).

For example, even in the case of failure of normal reception and decoding of data transmitted from one base station, if data transmitted from a different base station later could be normally received and decoded, it is possible to select the defect-free data. It is thus possible to improve the received signal quality in the base station coverage area boundary neighborhood.

Literate 1 (Japanese Patent Laid-open 2000-115070) proposes a one-time broadcast system, in which at the time of one-time broadcast one-time broadcast discrimination data for discriminating the one-time broadcast is transmitted to and stored in the receiving set side, at the time of one-time broadcast start the receiving set receives one-time broadcast data discrimination data from a relay means, compares the received data with already stored one-time broadcast discrimination data and, when the two data are identical, limits the reception. The system thus can present reception of the same one-time data in the receiving set a plurality of times.

Literature 2 (Japanese Patent Laid-open 2001-103529) proposes a communication terminal set, in which at the time of soft hand-over for communication with a plurality of base stations the quality of down line signals from the plurality of base stations is checked, and a base station of good down line signal quality is selected to be the next transmitting station in selective synthesis unit. It is thus possible to obtain high quality reception.

Literature 3 (Japanese Patent Laid-open Hei 11-284635) proposes an ATM cell transfer control method and transfer control system, which is effective in the case of burst cell defect generation during data transfer with AAL5 due to failure in a re-transfer process in a layer upper than a CPCS layer of the AAL 5 as a result of transfer quality deterioration or reception level deterioration caused by fading in a wireless transmission section. In such case, introduction of unnecessary traffic in a subsequent stage ATM backbone network can be prevented by stopping the transmission of cell data subsequent to the defect cell providing cell number data of cells before the defect cell to cell data. Besides, the unnecessary traffic part can be made charge-free in the ATM backbone network to improve the efficiency in use of the ATM backbone network.

The above prior art inventions, however, have the following problems.

The selective combining method for data broadcast by MBMS, even when earlier data transmitted from a certain base station has been suitably received and decoded, the same data later transmitted from a different base station is received and decoded, and RLC (Radio Link Control) as an upper rank layer checks whether the same data is already present and discards data determined to be the same. Therefore, consequently data receiving/decoding process on the same data is executed a plurality of times.

According to the invention disclosed in Literature 1, at the time of the one-time broadcast start the one-time broadcast discrimination data is received from the relay means and compared with the already stored one-time broadcast discrimination data, and when the two compared data are identical, the reception is limited, thereby preventing the reception of the same one-time broadcast by the receiving set a plurality of times. However, irrespective of whether the data transmitted earlier has been normally received, the reception of the data transmitted later is rejected. Therefore, data quality reduction is liable.

According to the invention disclosed in Literature 2, at the time of soft hand-over for communication with a plurality of base stations, the quality of the down-line signals from the plurality of base stations is checked, and a base station with good down-line signal quality is selected to be the next transmitting station in the selective synthesis unit. It is thus possible to receive good quality line signals. However, receiving/decoding process is executed on the same data a plurality of times.

According to the invention disclosed in Literature 3, in the case of detection of a defect in the received data, the reception of data subsequent to the defect detection is stopped, thus preventing unnecessary data reception and improving the network use efficiency. However, it is impossible to receive normal data.

SUMMARY OF THE INVENTION

The present invention has an object of providing portable terminal set and portable terminal control method, in which at the time of normal reception of certain data, receiving/decoding process on the same data broadcast later from a different base station is stopped, thus reducing power consumed in the data receiving/decoding process.

According to an aspect of the present invention, there is provided a portable terminal set comprising a receiving means for receiving data from a plurality of base stations, an de-spreading means for de-spreading the data received by the receiving means, a combining means for combining the same data from the base stations de-spread in the de-spreading means, a decoding means for decoding the data combined in the combining means, a selectively combining means for selectively combining the decoded data from the decoding means, a detecting means for detecting any defect in the selectively combined data from the selectively combining means, and a control means for controlling the operation of the entire portable terminal set, wherein: the portable terminal set further comprises: a first counting means for counting a time required for the processes in the de-spreading means, the combining means, the decoding means, the selectively combining means and the detecting means; an off-set time counting means for counting an off-set time from the start of data reception from a base station till the start of data reception from a different base station; and when the detecting means detects no defect in the data and also when the time counted in the first counting means is shorter than the off-set time, the control means interrupts the process in the de-spreading means, the combining means and the decoding means on the data from the different base station.

The portable terminal set further comprises a second counting means for counting a time required for the processes in the combining means, the decoding means, the detecting means and the selectively combining means; and when the detecting means detects no defect in the data and also when the time counted in the second counting means is shorter than the off-set time, the control means interrupts the processes in the combining means and the decoding means.

The portable terminal set further comprises a third counting means for counting a time required for the processes in the decoding means, the detecting means and the selectively combining means; and when the detecting means detects no defect in the data and also when the time counted in the third counting means is shorter than the off-set time, the control means interrupts the process in the decoding means.

The data incorporate sequence numbers indicative of their sequence and the detecting means detects a defect based on the sequence numbers. When the detecting means detects a defect in the data, the control means resumes the processes in all the means. The detecting means monitors for any defect for a predetermined period of time.

According to another aspect of the present invention, there is provided a control method of a portable terminal set including a receiving means for receiving data from a plurality of base stations, an de-spreading means for de-spreading the data received by the receiving means, a combining means for combining the same data from the base stations de-spread in the de-spreading means, a decoding means for decoding the data combined in the combining means, a selectively combining means for selectively combining the decoded data from the decoding means, a detecting means for detecting any defect in the selectively combined data from the selectively combining means, and a control means for controlling the operation of the entire portable terminal set, the method comprising steps of: a first counting step for counting a time required for the processes in the de-spreading means, the combining means, the decoding means, the selectively combining means and the detecting means; an off-set time counting step for counting an off-set time from the start of data reception from a base station till the start of data reception from a different base station; and interrupting step for interrupting the process in the de-spreading means, the combining means and the decoding means on the data from the different base station when the detecting means detects no defect in the data and also when the time counted in the first counting means is shorter than the off-set time.

The method further comprises a second counting step for counting a time required for the processes in the combining step, the decoding step, the detecting step and the selectively combining step; and interrupting step for interrupting the processes in the combining step and the decoding step when the detecting means detects no defect in the data and also when the time step in the second counting means is shorter than the off-set time.

The method further comprises a third counting step for counting a time required for the processes in the decoding step, the detecting step and the selectively combining step; and an interrupting step for interrupting the process in the decoding step when the detecting step detects no defect in the data and also when the time counted in the third counting step is shorter than the off-set time. The data incorporate sequence numbers indicative of their sequence and the detecting step detects a defect based on the sequence numbers. When the detecting step detects a defect in the data, the control step resumes the processes in all the steps. The detecting step monitors for any defect for a predetermined period of time.

According to further aspect of the present invention, there is provided a control method of a portable terminal set which receives data from a plurality of base stations, de-spreading the data received, combining the same data from the base stations de-spread in the de-spreading means, decoding the combined data, selectively combining the decoded data, detecting any defect in the selectively combined data, the method comprising steps of counting a first time required for the processes in the de-spreading, the combining, the decoding, the selectively combining and the detecting; counting an off-set time from the start of data reception from a base station till the start of data reception from a different base station; and interrupting the process in the de-spreading, the combining and the decoding on the data from the different base station when any defect is not detected in the data and also when the first time is shorter than the off-set time.

According to the present invention, monitoring is made as to whether header numbers incorporated in the data transmitted to the RLC after the a decoding process are continuous to detect presence of no header number defect as a result of monitoring for a predetermined period of time. A correlation between the detected result and spread codes of received signals and a pilot signal is taken to detect a multi-path timing. From the detected multi-path timing, a base station is determined, in which data are received in fingers. With this means, when the signals transmitted from a certain base station and in selective combining reception is good and are free from any data defect, de-spread, RAKE reception and decoding on data transmitted from any different base station can be interrupted, thus reducing power required for the processes.

With this means, the de-spread, RAKE reception and decoding on data transmitted from any different base station can be interrupted, thus reducing power required for the processes.

Other objects and features will be clarified from the following description with reference to attached drawings.

PREFERRED EMBODIMENTS OF THE INVENTION

Preferred embodiments of the present invention will now be described with reference to the drawings.

Figure 1:
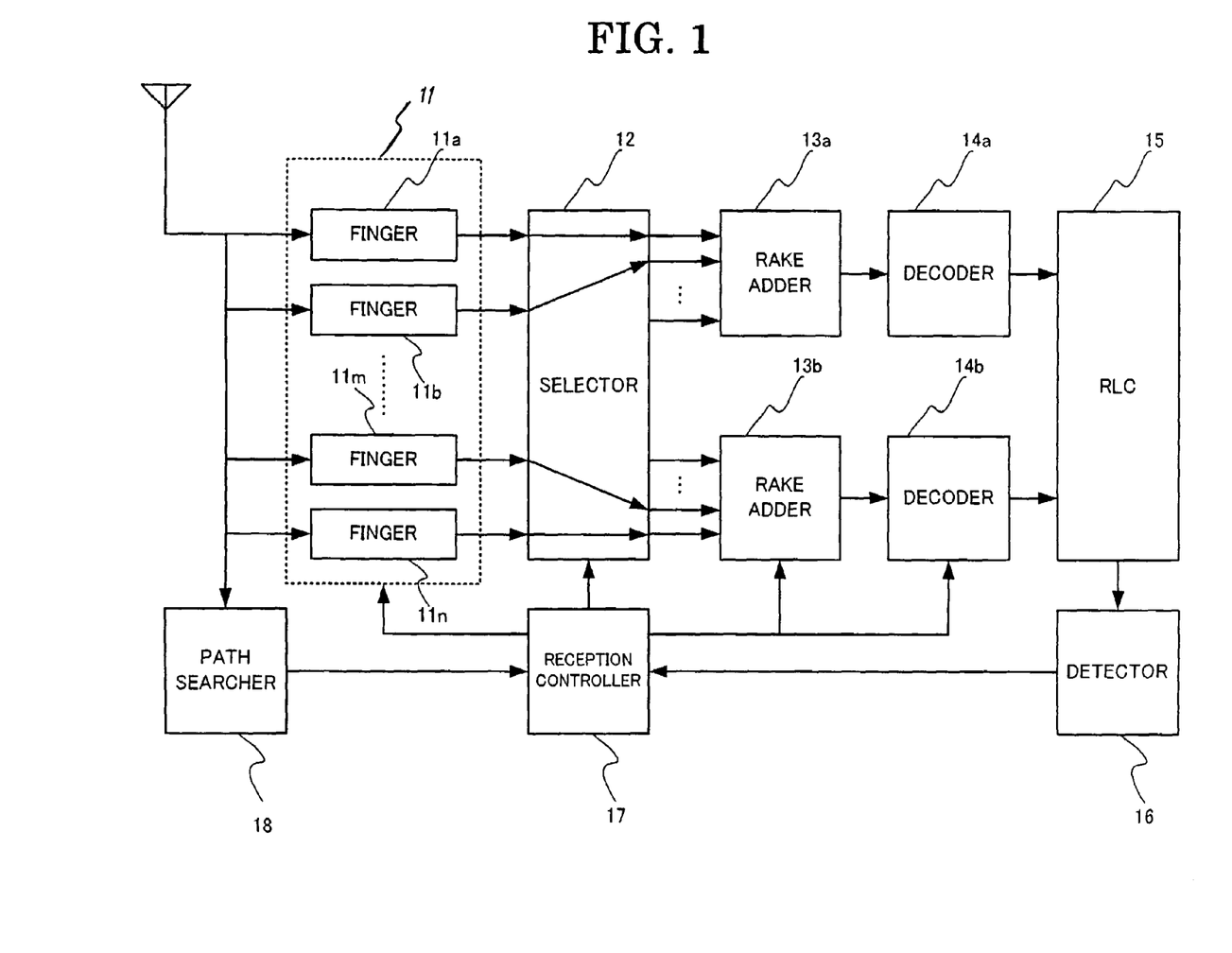
FIG. 1 is a block diagram showing the circuit arrangement of an embodiment of the portable terminal set according to the present invention.

FIG. 1 is a block diagram showing the circuit arrangement of an embodiment of the portable terminal set capable of receiving data from a broadcast service system according to the present invention.

A portable telephone set according to the present invention comprises a plurality of fingers 11a to 11n (collectively referred to as 11), a selector 12, RAKE adders 13a and 13b, decoders 14a and 14b, an RCL 15, a detector 16, a reception controller 17 and a path searcher 18.

The fingers 11 are circuits for multiplying signals received from base stations 21 and 22 by spread code at a timing designated by the reception controller 17, thereby obtaining a de-spread of the received signals (i.e., multi-path wave).

The selector 12 is a circuit for transmitting the inversely dispersed received signals obtained in the fingers 11 to the RAKE adders 13a and 13b with spread code designated by the reception controller 17 and at a timing detected by the path searcher 18.

In the wireless communication, a phenomenon of delayed reaching of radio waves reflected by buildings or the like on the earth occurs in addition to radio wave directly reaching from the transmitting side to the receiving side. Interference of the delayed waves causes communication quality reduction. For improving the communication quality, the RAKE adders 13a and 13b synthesizes a plurality of inversely dispersed received signals (i.e., multi-path wave) relevant to the multi-pathphenomenon. Specifically, the RAKE adders 13a and 13b are circuits for adding together the same data from the base stations as received from the individual fingers 11 via the selector 12, such that the data are added together by in-phase addition at a matched timing. When the intensity of a certain received signal is reduced by the fading, the RAKE adders 13a and 13b can restore the initial intensity with other delayed waves of higher intensities. Thus, it is possible to reduce the adverse effects of the fading.

The decoders 14a and 14b are circuits for decoding the in-phase addition data from the RAKE adders 13a and 13d.

The RLC 15 holds the decoded data from the decoders 14a and 14b for a predetermined period of time, and executes a selective combining process on the data on the basis of header data incorporated in the data. For example, when a defect is present in the data received from the decoder 14a, it is made up for with a corresponding part of the data received from the decoder 14b. When the defect cannot be made up for with the data received from the decoder 14b, the RLC 15 inputs the data to the detector 16 without making up for the defect. When no defect is present in the data from the two decoders, the RLC 15 discards data from one of the decoders only.

The detector 16 is a circuit for detecting the no defect in the data subjected to the selective combining process in the RLC 15 for a predetermined period of time or detecting the presence of a defect in the data subjected to the selective combining process in the RLC 15 and reporting the detected content to the reception controller 17.

According to the result of detection in the detector 16 and also from the multi-path timing detected in the path searcher 18, the reception controller 17 controls the operation of the finger for receiving the data from the base station. The reception controller 17 also detects the difference between the timings of data reception from the base stations 21 and 22, respectively (hereinafter referred to as base station off-set), and controls, with the base station off-set, the interruption and resumption of the data processes in the fingers, the RAKE adder 13b, the decoder 14b and the RLC 15. The reception controller further controls the selector 12 such as to transmit the data from the fingers de-spreading data from the base station 21 to the RAKE adder 13a and transmit the data from the fingers de-spreadng data from the base station 22 to the RAKE adder 13b.

The path searcher 18 is a circuit for detecting the timing of the multiplying of the received signals (i.e., multi-path wave) and the spread code by one another by taking the correlation of the spread codes of the received signals and a pilot signal.

Figure 2:
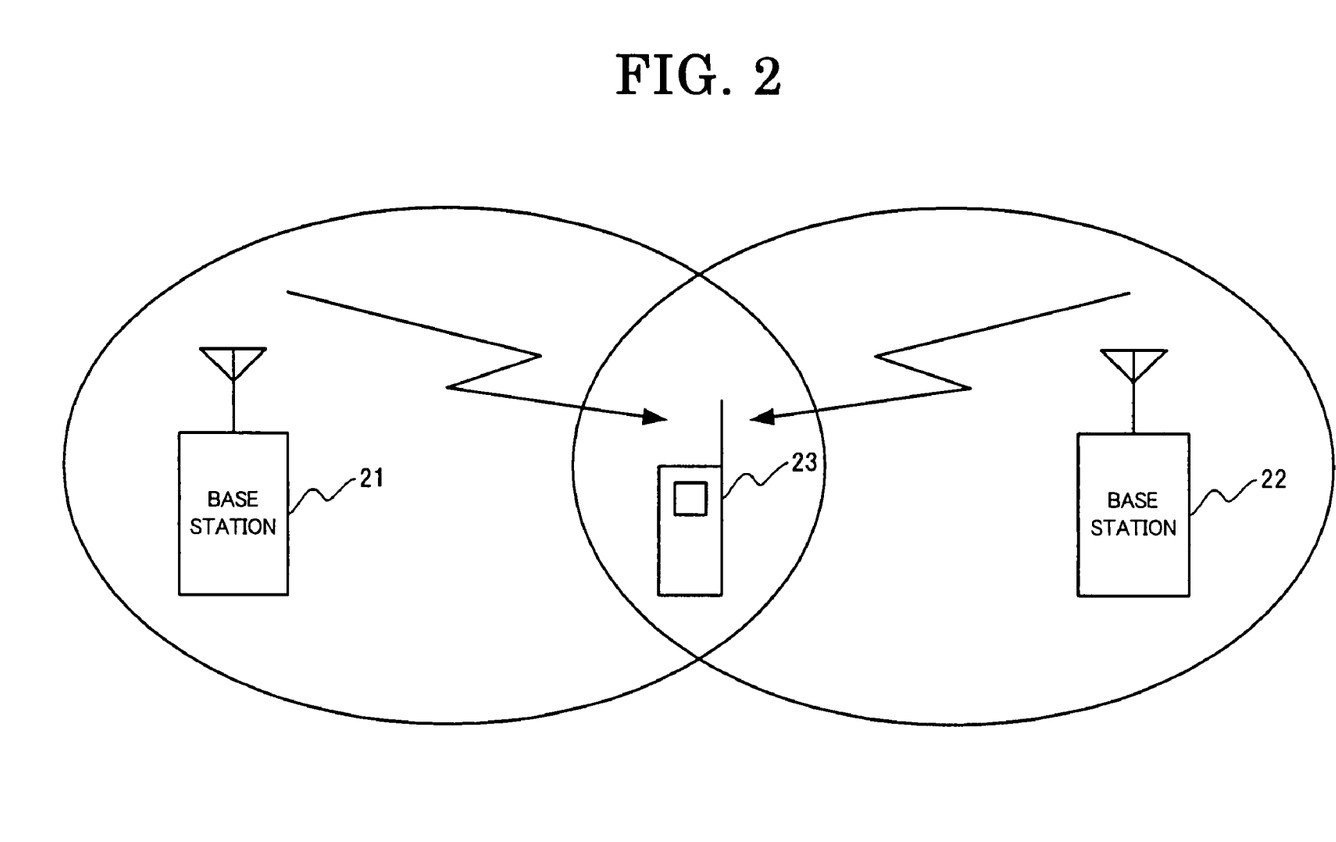
FIG. 2 is a view showing a state that a portable terminal set is located in the neighborhood of the boundary between two base stations.

In this embodiment of the portable terminal set, as shown in FIG. 2, a portable terminal set 23 receives signals from the base stations 21 and 22 at a time in the neighborhood of the boundary between the base stations 22 and 23.

Figure 3:
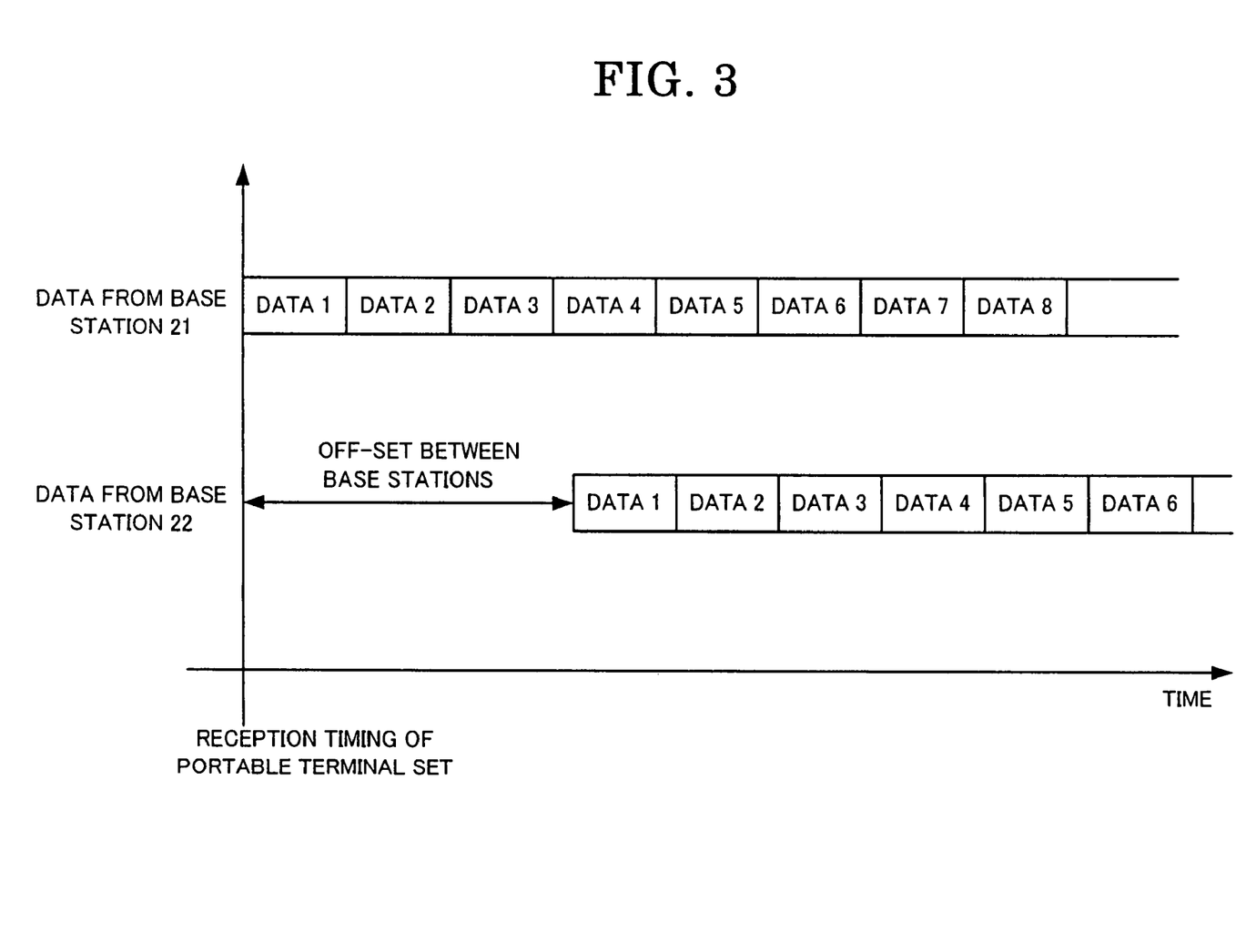
FIG. 3 is a view showing the state of reception of data from a plurality of base stations when the portable terminal set I located in the neighborhood of the base station boundary.

FIG. 3 shows the reception of data from a plurality of base stations when the portable terminal set 23 is in base station boundary neighborhood. In the example shown in FIG. 3, the portable terminal set 23 is receiving the same data from the base stations 21 and 22. However, the data from the base station 22 is transmitted and received later than the data from the base station 21.

Figure 4:
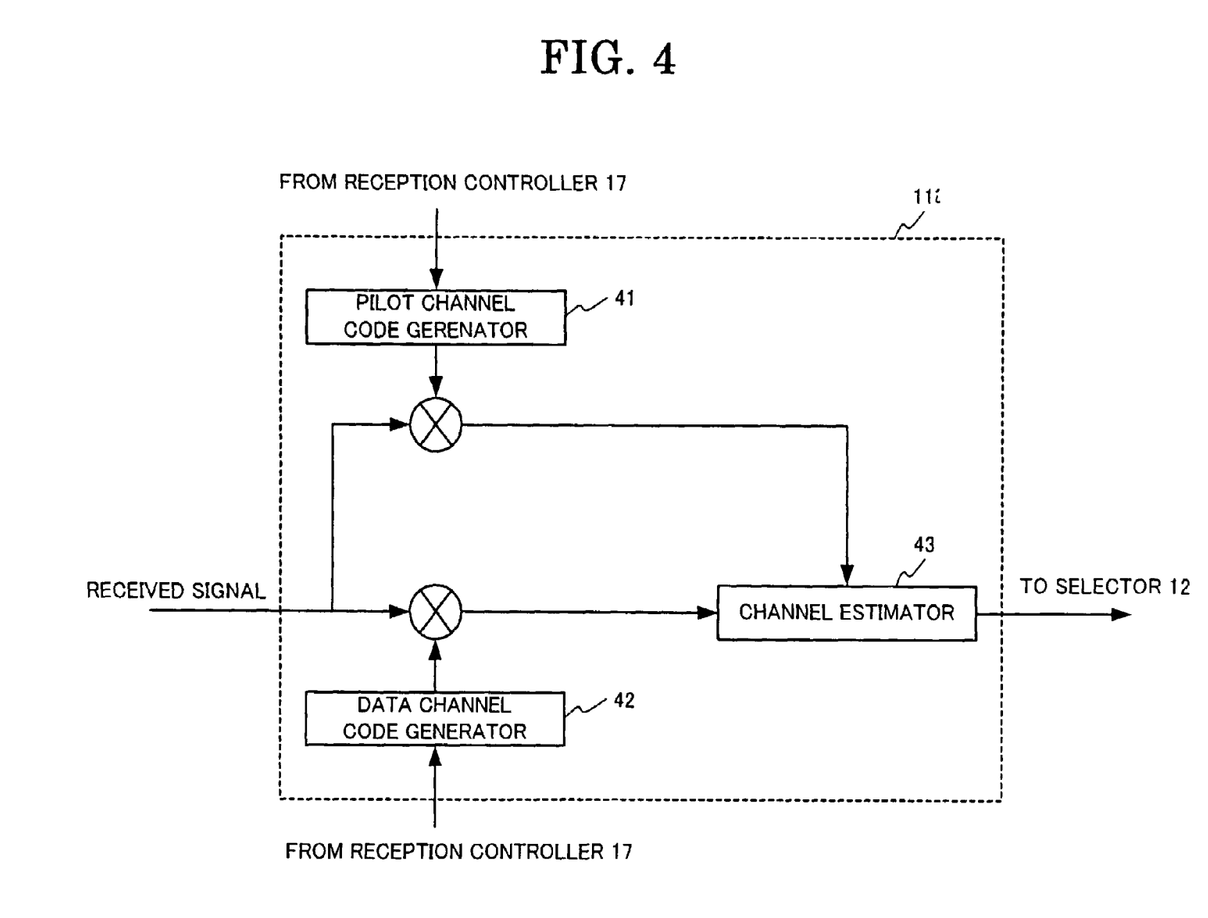
FIG. 4 is a block diagram showing the circuit arrangement of a finger.

FIG. 4 is a block diagram showing the arrangement of each finger 11i shown in FIG. 1. The finger 11i includes a pilot channel code generator 41, a data channel code generator and a channel estimator 43.

The pilot channel code generator 41 causes de-spread of the pilot signal by multiplying the pilot signal and the spread signal by each other at the timing of reception of the spread code from the reception controller 17. The data channel code generator 42 causes de-spread of the received signals by multiplying the received signals and the spread code by one another at the timing of reception of the spread code from the reception controller 17. The channel estimator 43 executes, by using the inversely dispersed pilot signal, a process of canceling the adverse effects of fading or the like on the received signals (hereinafter referred to channel estimation).

Figure 5:
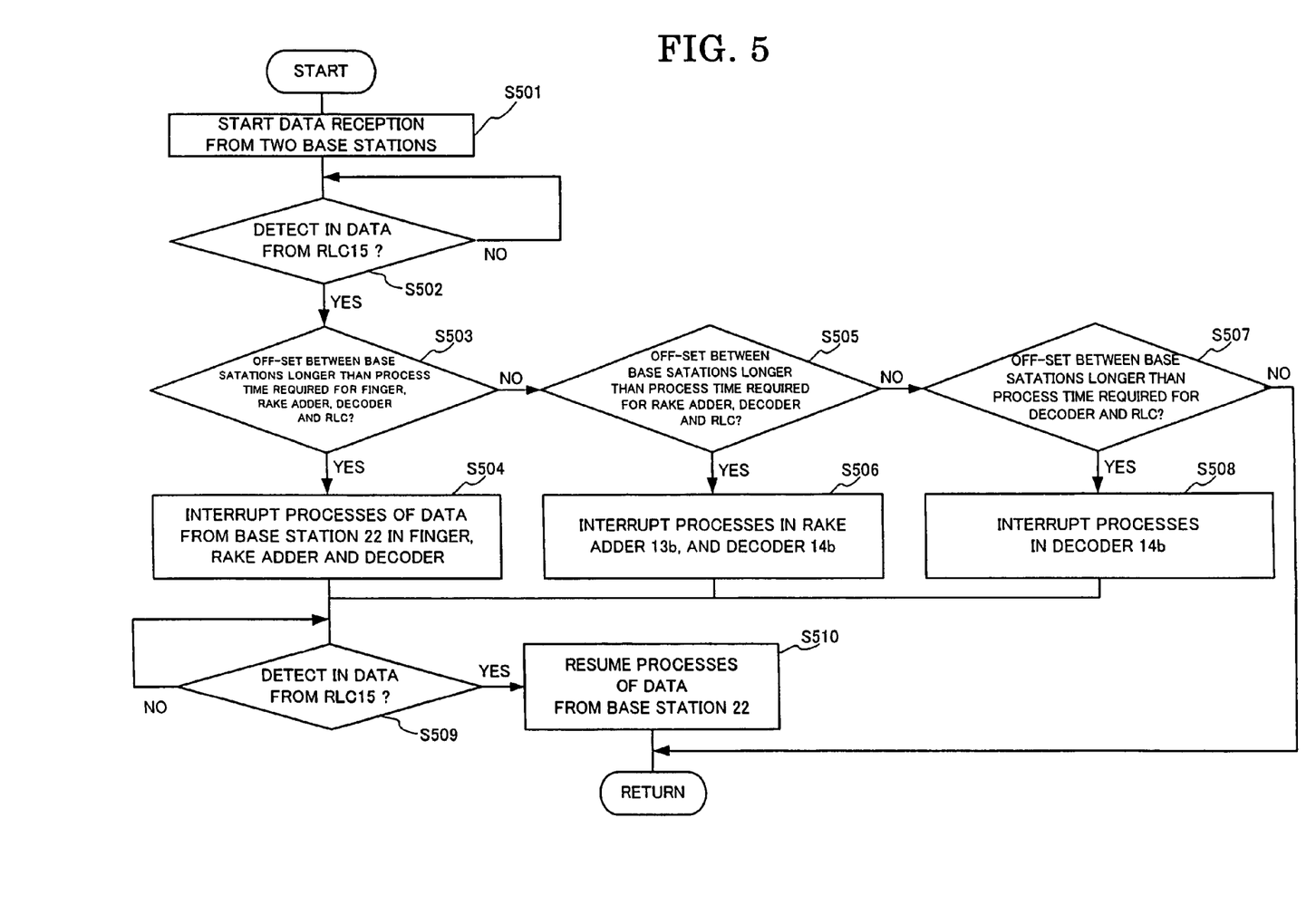
FIG. 5 is a flow chart illustrating the data receiving operation in the embodiment of the present invention.

Now, the data receiving process in the embodiment of the portable terminal set will be described with reference to FIG. 5.

When the portable terminal set 23 comes to the boundary between the coverage areas of the base stations 22 and 21 (as shown in FIG. 2) during its data reception in the coverage area of the base station 21 with common channel MBMS, for evading the quality deterioration of the received signals, it starts reception of the received signals of the same data from the base stations 21 and 22 (step S501). The received signal of the data from the base station 21 is inputted via the fingers 11, the selector 12, the RAKE adder 13a and the decoder 14a to the RCL 15. When the data from the base station 21 has been inputted to the RLC 15 for a predetermined period of time, the RLC 15 executes the selective data combining process on the data and outputs the resultant data to the detector 16. The detector 16 makes a check as to whether data obtained in the selective data combining process in the RLC 5 has any defect (step S502). The data defect check is made by confirming the content of the header added to the data. To the header, continuous numbers are assigned. When no data defect is present, the header content is constituted by continuous numbers.

When no data defect is found in the data from the base station 21 (step S502/"YES"), the detector 16 transmits, to the reception controller 17, data indicative of the fact that no defect is present in the data from the base station 21. The reception controller 17 receiving the data confirms the base station off-set with respect to the base station 22 from the base station 21, and determines the circuit for interrupting the process (steps S503, S505 and S507). This is done so because if the reception of data from the base station 22 is interrupted irrespective of the base station off-set, depending on the base station off-set it is no longer in time to receive defective data by resuming the reception of the data from the base station 22 after detection of a defect in the data from the base station 21. Specifically, when the base station off-set is longer than the sum of the times taken in the processes in the fingers 11 for receiving data from the base station 22, the RAKE adder 13b, the decoder 14b and the RLC 15 (step S503/"YES"), the reception controller 17 interrupts the de-spread of the data from the base station 22 in the fingers and the processes in the RAKE adder 13b, the decoder 14b and the RLC 15 (step S504). When the base station off-set is shorter than the above sum of times but longer than the sum of the times required for the processes in the RAKE adder 13b, the coder 14b and the RLC 15 (step S502/"NO", step S505/"YES"), the reception controller 17 interrupts only the processes in the RAKE adder 13b, the decoder 14b and the RLC 15 (step S506). When the base station off-set is shorter than the above time sum but longer than the sum of the times required for the processes in the decoder 14 and the RLC 15 (step S505/"NO" and step 507/"YES"), in step S508 the reception controller 17 interrupts the processes in the decoder 114b and RLC 15. When the base station off-set is shorter than any of the above time sums (step S507/"NO"), the reception controller 17 does not interrupt the processes in the individual circuits.

As shown above, when the processes of the data received from the base station 22 are partly interrupted according to the value of the base station off-set, only the decoding result from the decoder 14a as data from the base station 21 is inputted to the RLC 15 (this state being referred to as selective combining reception waiting state). In the selective combining reception waiting state, the detector 16 monitors for any defect present in the data inputted from the decoder 14a to the RLC 15 (step S509). When the detector 16 detects a defect in the data (step S509/"YES"), it transmits this data to the reception controller 17. The reception controller 17 receiving the data resumes the de-spread in the fingers and processes in the RAKE 13b and the decoder 14b concerning the data from the base station 22, of which data the de-spread and processes have been interrupted according to the base station off-set (step S510).

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable terminal set comprising a receiving means for receiving data from a plurality of base stations, a de-spreading means for de-spreading the data received by the receiving means, a combining means for combining the same data from the base stations de-spread in the de-spreading means, a decoding means for decoding the data combined in the combining means, a selectively combining means for selectively combining the decoded data from the decoding means, a detecting means for detecting any defect in the selectively combined data from the selectively combining means, and a control means for controlling the operation of the entire portable terminal set, wherein:
the portable terminal set further comprises:
a first counting means for counting a time required for the processes in the de-spreading means, the combining means, the decoding means, the selectively combining means and the detecting means;
an off-set time counting means for counting an off-set time from the start of data reception from a base station till the start of data reception from a different base station; and
when the detecting means detects no defect in the data and also when the time counted in the first counting means is shorter than the off-set time, the control means interrupts the processes in the de-spreading means, the combining means and the decoding means on the data from the different base station.

2. A portable terminal set comprising a receiving means for receiving data from a plurality of base stations, a de-spreading means for de-spreading the data received by the receiving means, a combining means for combining the same data from the base stations de-spread in the de-spreading means, a decoding means for decoding the data combined in the combining means, a selectively combining means for selectively combining the decoded data from the decoding means, a detecting means for detecting any defect in the selectively combined data from the selectively combining means, and a control means for controlling the operation of the entire portable terminal set, wherein:
the portable terminal set further comprises:
a first counting means for counting a time required for the processes in the de-spreading means, the combining means, the decoding means, the selectively combining means and the detecting means;
an off-set time counting means for counting an off-set time from the start of data reception from a base station till the start of data reception from a different base station;
when the detecting means detects no defect in the data and also when the time counted in the first counting means is shorter than the off-set time, the control means interrupts the processes in the de-spreading means, the combining means and the decoding means based on the data from the different base station;
a second counting means for counting a time required for the processes in the combining means, the decoding means, the detecting means and the selectively combining means; and
when the detecting means detects no defect in the data and also when the time counted in the second counting means is shorter than the off-set time, the control means interrupts the processes in the combining means and the decoding means based on the data from the different base station.

3. The portable terminal set according to claim 2, wherein:
the portable terminal set further comprises a third counting means for counting a time required for the processes in the decoding means, the detecting means and the selectively combining means; and
when the detecting means detects no defect in the data and also when the time counted in the third counting means is shorter than the off-set time, the control means interrupts the process in the decoding means based on the data from the different base station.

4. The portable terminal set according to claim 1 or 2, wherein:
the data incorporate sequence numbers indicative of their sequence and the detecting means detects a defect based on the sequence numbers.

5. The portable terminal set according to claim 1 or 2, wherein when the detecting means detects a defect in the data, the control means resumes the processes in all the means.

6. The portable terminal set according to claim 1 or 2, wherein the detecting means monitors for any defect for a predetermined period of time.

7. A control method of a portable terminal set including a receiving means for receiving data from a plurality of base stations, a de-spreading means for de-spreading the data received by the receiving means, a combining means for combining the same data from the base stations de-spread in the de-spreading means, a decoding means for decoding the data combined in the combining means, a selectively combining means for selectively combining the decoded data from the decoding means, a detecting means for detecting any defect in the selectively combined data from the selectively combining means, and a control means for controlling the operation of the entire portable terminal set, the method comprising steps of:

a first counting step, performed by a first counting means, for counting a time required for the processes in the de-spreading means, the combining means, the decoding means, the selectively combining means and the detecting means;

an off-set time counting step for counting an off-set time from the start of data reception from a base station till the start of data reception from a different base station; and  interrupting step for interrupting the processes in the de-spreading means, the combining means and the decoding means based on the data from the different base station when the detecting means detects no defect in the data and also when the time counted in the first counting step is shorter than the off-set time.

8. A control method of a portable terminal set including a receiving means for receiving data from a plurality of base stations, a de-spreading means for de-spreading the data received by the receiving means, a combining means for combining the same data from the base stations de-spread in the de-spreading means, a decoding means for decoding the data combined in the combining means, a selectively combining means for selectively combining the decoded data from the decoding means, a detecting means for detecting any defect in the selectively combined data from the selectively combining means, and a control means for controlling the operation of the entire portable terminal set, the method comprising steps of:

a first counting step, performed by a first counting means, for counting a time required for the processes in the de-spreading means, the combining means, the decoding means, the selectively combining means and the detecting means;

an off-set time counting step for counting an off-set time from the start of data reception from a base station till the start of data reception from a different base station;

a first interrupting step for interrupting the processes in the de-spreading means, the combining means and the decoding means based on the data from the different base station when the detecting means detects no defect in the data and also when the time counted in the first counting step is shorter than the off-set time;

a second counting step for counting a time required for the processes in the combining means, the decoding means, the detecting means and the selectively combining means; and  a second interrupting step for interrupting the processes in the combining means and the decoding means based on the data from the different base station when the detecting means detects no defect in the data and also when the time counted in the second counting step is shorter than the off-set time.

9. The method according to claim 8, further comprising a third counting step for counting a time required for the processes in the decoding means, the detecting means and the selectively combining means; and an interrupting step for interrupting the process in the decoding means based on the data from the different base station when the detecting means detects no defect in the data and also when the time counted in the third counting step is shorter than the off-set time.

10. The method according to claim 7 or 8, wherein the data incorporate sequence numbers indicative of their sequence and the detecting means detects a defect based on the sequence numbers.

11. The method according to claim 7 or 8, wherein when the detecting means detects a defect in the data, the control means resumes the processes in all the means.

12. The method according to claim 7 or 8, wherein the detecting means monitors for any defect for a predetermined period of time.

13. A control method of a portable terminal set which receives data from a plurality of base stations, de-spreads the data received in a de-spreading step, combines, in a combining step, the same data from the base stations de-spread in the de-spreading step, decodes, in a decoding step, the combined data, selectively combines the decoded data in a selectively combining step, and detects any defect in the selectively combined data in a detecting step, the method comprising steps of: counting a first time required for the processes in the de-spreading, the combining, the decoding, the selectively combining and the detecting using a first counting means  counting an off-set time from the start of data reception from a base station till the start of data reception from a different base station; and  interrupting the process in the de-spreading, the combining and the decoding on the data from the different base station when any defect is not detected in the data and also when the first time is shorter than the off-set time.

14. The method according to claim 13, wherein:

the data incorporate sequence numbers indicative of their sequence and wherein any defects in the selectively combined data is detected based on the sequence numbers.

15. The method according to claim 13, wherein when a defect in the data is detected, the processes interrupted in the interrupting step are restarted.

16. The method according to claim 13, wherein any defects in the selected combined data is detected for a predetermined period of time.

\* \* \* \* \*